No. 825,382. PATENTED JULY 10, 1906.
L. J. DAVIS.
FOUNTAIN OR FEED DEVICE FOR POULTRY.
APPLICATION FILED OCT. 3, 1905.
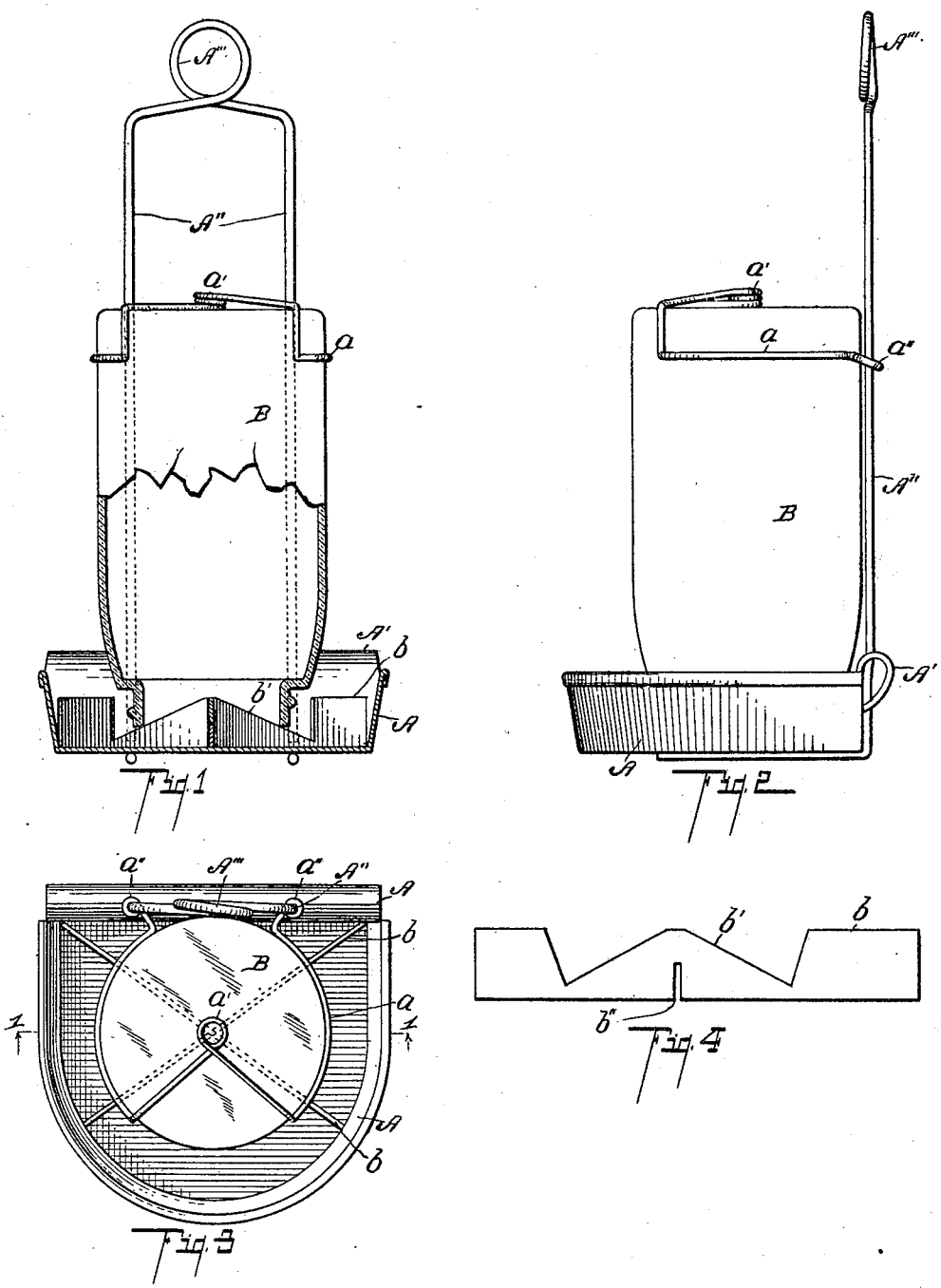
Witnesses:
Ethel A. Bradford
A. J. Alber
Inventor,
Linford J. Davis
By Chappell & Earl
Att'ys

UNITED STATES PATENT OFFICE.

LINFORD J. DAVIS, OF BATTLE CREEK, MICHIGAN.

FOUNTAIN OR FEED DEVICE FOR POULTRY.

No. 825,382.  Specification of Letters Patent.  Patented July 10, 1906.

Application filed October 3, 1905. Serial No. 281,160.

*To all whom it may concern:*

Be it known that I, LINFORD J. DAVIS, a citizen of the United States, residing at the city of Battle Creek, county of Calhoun, State of Michigan, have invented certain new and useful Improvements in Fountains or Feed Devices for Poultry, of which the following is a specification.

This invention relates to improvements in fountains or feeders for poultry.

The main object of this invention is to provide an improved fountain or feeder for poultry which is very simple and economical in structure and convenient to manipulate.

Another object is to provide an improved fountain or feeder for poultry which can be very readily cleaned.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawings, forming a part of this specification, in which—

Figure 1 is a front elevation view of my improved fountain or feeder for poultry, partially in section, on a line corresponding to line 1 1 of Fig. 3. Fig. 2 is a side elevation view of my improved fountain or poultry-feeder. Fig. 3 is a plan view thereof. Fig. 4 is a side elevation view of the supporting-pieces B for the can or storage-receptacle.

In the drawings similar letters of reference refer to similar parts throughout the several views.

Referring to the drawings, A is a pan or open vessel which serves as a trough. This is preferably formed of tin or sheet metal, with the upper edge of its rear walls formed into a flange A', through which the lower ends of the standards A" are arranged and soldered as a convenient means for securing the same to the pan. These standards serve to support the can or storage-receptacle B in an upright position in the trough and are also preferably arranged to serve as a hanger for the device. The standards A" are preferably formed of a single piece of wire, being bent to form a ring A''' at their upper end.

The storage or supply can B is preferably a common fruit-jar or bottle, a fruit-jar being illustrated, and is placed in an inverted position upon the supports b' therefor. These supports are preferably formed of sheet metal and are slitted at b'' to interlock, by which means they are held in an upright position in the bottom of the trough A.

The open end of the receptacle B rests upon the V-shaped portion b' of the supports. By forming the supports V-shaped they are adapted to receive a reservoir having a mouth-opening of any size within the scope of the structure. The can or reservoir B is detachably secured in position by the spring-bail a. This bail is slidably secured to the standards A" by its looped ends a". This bail is preferably formed of wire with an offset portion adapted to engage the top of the can, having a coil therein to form a spring. By thus forming the bail it readily accommodates any size receptacle within its scope, which is of course of great advantage.

By arranging the parts as I have illustrated and described I secure a fountain or feed device for poultry or small live stock which is very simple in structure and is very easy to manipulate. It is adapted for use both as a fountain and as a feeder. The bail or retainer $a$ is adapted to various sizes of storage-receptacles, as is also the support therefor within the pan. The parts can be readily disassembled for cleaning and as readily reassembled.

I have illustrated and described my improved fountain or feeder in detail in the form preferred by me, although I am aware that it is capable of considerable structural variation without departing from my invention.

Having thus described my invention, what I claim as new, and desire to secure by Letters Patent, is—

1. The combination of a pan or trough having a flange formed on the upper edge of its rear wall; standards formed of a single piece of wire formed into a ring at their upper ends inserted through said flange on said pan and secured thereto; a storage can or receptacle arranged in an inverted position in said trough; supports therefor formed of sheet metal, having inverted-V-shaped portions on which said storage can or receptacle rests, said supports being slotted and interlocked, whereby they are retained in position; and a bail for securing said storage can or receptacle to said standards, slidably secured to said standards by looping about the same, said bail being formed of a single piece of wire, having an offset portion arranged to rest on said storage can or receptacle, said offset portion having a spring-coil formed therein, for the purpose specified.

2. The combination of a pan or trough; standards secured thereto; a storage can or receptacle arranged in an inverted position in said trough; supports therefor formed of sheet metal, having inverted-V-shaped portions on which said storage can or receptacle rests, said supports being slotted and interlocked, whereby they are retained in position; and a bail for securing said storage can or receptacle to said standards, slidably secured to said standards by looping about the same, said bail being formed of a single piece of wire, having an offset portion arranged to rest on said storage can or receptacle, said offset portion having a spring-coil formed therein, for the purpose specified.

3. The combination of a pan or trough; standards secured thereto; a storage can or receptacle arranged in an inverted position in said trough; supports therefor formed of sheet metal, having inverted-V-shaped portions on which said storage can or receptacle rests, said supports being slotted and interlocked, whereby they are retained in position; and a bail for securing said storage can or receptacle to said standards, formed of a single piece of wire, having an offset portion arranged to rest on said storage can or receptacle, said offset portion having a spring-coil formed therein, for the purpose specified.

4. The combination of a pan or trough having a flange formed on the upper edge of its rear wall; standards formed of a single piece of wire formed into a ring at their upper ends inserted through said flange on said pan and secured to said pan; a storage can or receptacle arranged in an inverted position in said trough; and a bail for securing said storage can or receptacle to said standards, slidably secured to said standards by looping about the same, said bail being formed of a single piece of wire, having an offset portion arranged to rest on said storage can or receptacle, said offset portion having a spring-coil formed therein, for the purpose specified.

5. The combination of a pan or trough; standards secured thereto; a storage can or receptacle arranged in an inverted position in said trough; and a bail for securing said storage can or receptacle to said standards, slidably secured to said standards by looping about the same, said bail being formed of a single piece of wire, having an offset portion arranged to rest on said storage can or receptacle, said offset portion having a spring-coil formed therein, for the purpose specified.

6. The combination of a pan or trough; standards secured thereto; a storage can or receptacle arranged in an inverted position in said trough; and a bail for securing said storage can or receptacle to said standards, formed of a single piece of wire, having an offset portion arranged to rest on said storage can or receptacle, said offset portion having a spring-coil formed therein, for the purpose specified.

7. The combination of a pan or trough; a standard secured thereto; a storage can or receptacle arranged in an inverted position in said trough; supports therefor formed of sheet metal, having inverted-V-shaped portions on which said storage can or receptacle rests, said supports being slotted and interlocked, whereby they are retained in position; and a spring-bail for securing said storage can or receptacle to said standard, slidably secured thereto, for the purpose specified.

8. The combination of a pan or trough; a standard secured thereto; a storage can or receptacle arranged in an inverted position in said trough; supports therefor formed of sheet metal, having inverted-V-shaped portions on which said storage can or receptacle rests, said supports being slotted and interlocked, whereby they are retained in position; and a spring-bail for securing said storage can or receptacle to said standard, for the purpose specified.

9. The combination of a pan or trough; a standard secured thereto; a storage can or receptacle arranged in an inverted position in said trough; supports therefor formed of sheet metal, having inverted-V-shaped portions on which said storage can or receptacle rests, said supports being slotted and interlocked, whereby they are retained in position; and a bail for securing said storage can or receptacle to said standard, slidably secured thereto, for the purpose specified.

10. The combination of a pan or trough; a standard secured thereto; a storage can or receptacle arranged in an inverted position in said trough; supports therefor formed of sheet metal, having inverted-V-shaped portions on which said storage can or receptacle rests, said supports being slotted and interlocked, whereby they are retained in position; and a bail for securing said storage can or receptacle to said standard, for the purpose specified.

11. The combination of a pan or trough; a standard secured thereto; a storage can or receptacle arranged in an inverted position in said trough; and a spring-bail for securing said storage can or receptacle to said standard, slidably secured thereto, for the purpose specified.

12. The combination of a pan or trough; a standard secured thereto; a storage can or receptacle arranged in an inverted position in said trough; and a spring-bail for securing said storage can or receptacle to said standard, for the purpose specified.

13. The combination of a pan or trough: a standard secured thereto; a storage can or receptacle arranged in an inverted position in said trough; and a bail for securing said storage can or receptacle to said standard, for the purpose specified.

14. The combination of a pan or trough; a storage can or receptacle arranged in an inverted position in said trough; and supports therefor formed of sheet metal, having inverted-V-shaped central portions on which said storage can or receptacle rests, said supports being slotted and interlocked, whereby they are retained in position; for the purpose specified.

15. The combination of a pan or trough; a storage can or receptacle arranged in an inverted position in said trough; and a support therefor having an inverted-V-shaped portion on which said storage can or receptacle rests, for the purpose specified.

16. The combination of a pan or trough; a standard secured thereto; a storage can or receptacle arranged in an inverted position in said trough; an inverted-V-shaped support for said storage-can arranged in said trough; and a bail for securing said storage can or receptacle to said standard, for the purpose specified.

In witness whereof I have hereunto set my hand and seal in the presence of two witnesses.

LINFORD J. DAVIS. [L. S.]

Witnesses:
EMILY MAE RICHTMYER,
DORA M. LUTZ.